United States Patent
Shapiro et al.

(10) Patent No.: US 11,338,387 B2
(45) Date of Patent: May 24, 2022

(54) ENGRAVING IN A COMPUTER NUMERICALLY CONTROLLED MACHINE

(71) Applicant: Glowforge Inc., Seattle, WA (US)

(72) Inventors: Daniel Shapiro, Mercer Island, WA (US); Mark Gosselin, Seattle, WA (US); Anthony Wright, Seattle, WA (US); Rachael Ludwick, Seattle, WA (US); Jonathan Park, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 118 days.

(21) Appl. No.: 16/919,657

(22) Filed: Jul. 2, 2020

(65) Prior Publication Data

US 2020/0331095 A1    Oct. 22, 2020

Related U.S. Application Data

(63) Continuation of application No. 15/823,505, filed on Nov. 27, 2017, now Pat. No. 10,737,355.
(Continued)

(51) Int. Cl.
*B23K 26/04*     (2014.01)
*B23K 26/402*    (2014.01)
(Continued)

(52) U.S. Cl.
CPC ............ *B23K 26/04* (2013.01); *B23K 26/032* (2013.01); *B23K 26/0622* (2015.10);
(Continued)

(58) Field of Classification Search
None
See application file for complete search history.

(56) References Cited

U.S. PATENT DOCUMENTS

| 3,721,811 A | 3/1973 | Taylor et al. |
| 3,967,176 A | 6/1976 | Wagener et al. |

(Continued)

FOREIGN PATENT DOCUMENTS

| CN | 101095033 A | 12/2007 |
| CN | 101733558 A | 6/2010 |

(Continued)

OTHER PUBLICATIONS

Dazhong Wu et al. "Cloud Manufacturing: Drivers, Current Status, and Future Trends." vol. 2. Systems; Micro And Nano Technologies Sustainable Manufacturing. Jun. 10, 2013. Retrieved on May 10, 2016. pp. 1-10.
(Continued)

*Primary Examiner* — Carlos R Ortiz Rodriguez
(74) *Attorney, Agent, or Firm* — Lee Sullivan Shea & Smith LLP

(57) ABSTRACT

A method for dithering can include receiving, at a computer numerically controlled machine comprising a laser, a motion plan corresponding to a first image. The output of the laser can be dithered, in accordance with the motion plan, to effect a change in a material within an interior space of the computer numerically controlled machine. The change can substantially reproduce at least a portion of the first image on the material. The dithering can include providing laser energy to the material at a native resolution based at least on a spot size of the laser. The spot size can be determined based at least on one or more parameters of the computer numerically controlled machine and/or one or more properties of the material. The laser energy can be delivered at locations separated by a distance no less than the spot size.

20 Claims, 24 Drawing Sheets

Related U.S. Application Data

(60) Provisional application No. 62/426,435, filed on Nov. 25, 2016.

(51) Int. Cl.

| | |
|---|---|
| *B23K 37/04* | (2006.01) |
| *B23K 26/0622* | (2014.01) |
| *B23K 26/08* | (2014.01) |
| *B23K 26/38* | (2014.01) |
| *B23K 26/364* | (2014.01) |
| *B23K 26/40* | (2014.01) |
| *B23K 37/02* | (2006.01) |
| *G05B 19/4093* | (2006.01) |
| *B23K 26/361* | (2014.01) |
| *B23K 26/03* | (2006.01) |
| *B23K 26/06* | (2014.01) |
| *B23K 26/073* | (2006.01) |
| *B23K 26/362* | (2014.01) |
| *B23K 103/00* | (2006.01) |

(52) U.S. Cl.
CPC ...... *B23K 26/0626* (2013.01); *B23K 26/0736* (2013.01); *B23K 26/0853* (2013.01); *B23K 26/361* (2015.10); *B23K 26/362* (2013.01); *B23K 26/364* (2015.10); *B23K 26/38* (2013.01); *B23K 26/40* (2013.01); *B23K 26/402* (2013.01); *B23K 37/0235* (2013.01); *B23K 37/0408* (2013.01); *B23K 37/0461* (2013.01); *G05B 19/40937* (2013.01); *B23K 2103/40* (2018.08); *B23K 2103/42* (2018.08); *G05B 2219/45041* (2013.01); *Y02P 90/02* (2015.11)

(56) References Cited

U.S. PATENT DOCUMENTS

| | | | |
|---|---|---|---|
| 4,055,787 A | 10/1977 | Beadle et al. | |
| 4,138,718 A | 2/1979 | Toke et al. | |
| 4,650,287 A | 3/1987 | Kudo et al. | |
| 4,723,219 A | 2/1988 | Beyer et al. | |
| 4,901,359 A | 2/1990 | Bruder | |
| 4,918,611 A | 4/1990 | Shyu et al. | |
| 5,298,843 A | 3/1994 | Miyajima et al. | |
| 5,355,250 A | 10/1994 | Grasso et al. | |
| 5,396,279 A | 3/1995 | Vossen | |
| 5,475,521 A | 12/1995 | Heidemann | |
| 5,756,961 A | 5/1998 | Sato et al. | |
| 6,031,200 A | 2/2000 | Whitehouse | |
| 6,085,122 A | 7/2000 | Manning | |
| 6,609,044 B1 | 8/2003 | Basista et al. | |
| 6,628,322 B1 | 9/2003 | Cerruti | |
| 8,111,904 B2 | 2/2012 | Wallack et al. | |
| 8,136,432 B2 | 3/2012 | Travez et al. | |
| 8,809,780 B2 | 8/2014 | Wollenhaupt et al. | |
| 9,020,628 B2 | 4/2015 | Fagan | |
| 9,235,205 B2 | 1/2016 | Prestidge et al. | |
| 9,469,338 B2 | 10/2016 | Norberg Ohlsson | |
| 9,618,926 B1 | 4/2017 | Louette et al. | |
| 9,734,419 B1 | 8/2017 | Ye et al. | |
| 9,912,915 B2 | 3/2018 | Sinclair | |
| 9,987,798 B2 | 6/2018 | Tyler | |
| 10,234,260 B2 | 3/2019 | Siercks et al. | |
| 2001/0012973 A1 | 8/2001 | Wehrli et al. | |
| 2002/0129485 A1 | 9/2002 | Mok et al. | |
| 2003/0049373 A1 | 3/2003 | Van De Rijdt et al. | |
| 2004/0207831 A1 | 10/2004 | Aoyama | |
| 2004/0223165 A1 | 11/2004 | Kurokawa et al. | |
| 2005/0051523 A1 | 3/2005 | Legge et al. | |
| 2005/0069682 A1 | 3/2005 | Tseng | |
| 2005/0071020 A1 | 3/2005 | Yamazaki et al. | |
| 2005/0115941 A1 | 6/2005 | Sukhman et al. | |
| 2005/0187651 A1 | 8/2005 | Kimura et al. | |
| 2007/0032733 A1 | 2/2007 | Burton | |
| 2008/0149604 A1 | 6/2008 | Varriano-Marston et al. | |
| 2008/0160254 A1 | 7/2008 | Arnold | |
| 2008/0243299 A1 | 10/2008 | Johnson et al. | |
| 2008/0249653 A1 | 10/2008 | Ichikawa | |
| 2009/0250445 A1 | 10/2009 | Yamaguchi et al. | |
| 2010/0063603 A1 | 3/2010 | Chandhoke | |
| 2010/0081971 A1 | 4/2010 | Allison | |
| 2010/0149337 A1 | 6/2010 | Porcino | |
| 2010/0193482 A1 | 8/2010 | Ow et al. | |
| 2010/0274379 A1 | 10/2010 | Hehl | |
| 2010/0301023 A1 | 12/2010 | Unrath et al. | |
| 2011/0127333 A1 | 6/2011 | Veksland et al. | |
| 2011/0193943 A1 | 8/2011 | Campbell | |
| 2011/0316977 A1 | 12/2011 | Pienaar | |
| 2012/0035745 A1 | 2/2012 | Mori et al. | |
| 2012/0117787 A1 | 5/2012 | Sun et al. | |
| 2012/0197427 A1 | 8/2012 | Gallucci et al. | |
| 2012/0293821 A1 | 11/2012 | Chiba | |
| 2013/0158957 A1 | 6/2013 | Lee et al. | |
| 2013/0178972 A1 | 7/2013 | Goldsmith et al. | |
| 2013/0190898 A1 | 7/2013 | Shilpiekandula et al. | |
| 2013/0200053 A1 | 8/2013 | Bordatchev | |
| 2013/0304248 A1 | 11/2013 | Lange et al. | |
| 2014/0005804 A1 | 1/2014 | Brand | |
| 2014/0018779 A1 | 1/2014 | Worrell et al. | |
| 2014/0039707 A1 | 2/2014 | Curtis et al. | |
| 2014/0071330 A1 | 3/2014 | Zhang et al. | |
| 2014/0071502 A1 | 3/2014 | Liu | |
| 2014/0160273 A1 | 6/2014 | Jedynak et al. | |
| 2014/0310122 A1 | 10/2014 | Danielson et al. | |
| 2014/0371895 A1 | 12/2014 | Sadusk et al. | |
| 2015/0107033 A1 | 4/2015 | Chang et al. | |
| 2015/0108095 A1 | 4/2015 | Kruer et al. | |
| 2015/0112470 A1 | 4/2015 | Chang et al. | |
| 2015/0154453 A1 | 6/2015 | Wilf | |
| 2015/0212421 A1 | 7/2015 | deVilliers et al. | |
| 2015/0245549 A1 | 8/2015 | Kurita et al. | |
| 2015/0355621 A1 | 12/2015 | Ikeda et al. | |
| 2015/0378348 A1 | 12/2015 | Gupta et al. | |
| 2016/0084649 A1 | 3/2016 | Yamazaki et al. | |
| 2016/0147213 A1 | 5/2016 | Murakami | |
| 2016/0156771 A1 | 6/2016 | Lee | |
| 2016/0199945 A1 | 7/2016 | McDowell et al. | |
| 2016/0210737 A1 | 7/2016 | Straub et al. | |
| 2016/0271718 A1 | 9/2016 | Fagan | |
| 2016/0303845 A1 | 10/2016 | Arce | |
| 2016/0325541 A1 | 11/2016 | Lavrentyev et al. | |
| 2016/0360409 A1 | 12/2016 | Singh | |
| 2017/0045877 A1 | 2/2017 | Shapiro et al. | |
| 2017/0045879 A1 | 2/2017 | Yang et al. | |
| 2017/0057008 A1 | 3/2017 | Liu et al. | |
| 2017/0123362 A1 | 5/2017 | Masui et al. | |
| 2017/0235293 A1 | 8/2017 | Shapiro et al. | |
| 2017/0235294 A1 | 8/2017 | Shapiro et al. | |
| 2017/0243374 A1 | 8/2017 | Matsuzawa | |
| 2018/0001565 A1 | 1/2018 | Hocker | |
| 2018/0113434 A1 | 4/2018 | Shapiro et al. | |
| 2018/0147657 A1 | 5/2018 | Shapiro | |
| 2018/0147658 A1 | 5/2018 | Shapiro | |
| 2018/0147659 A1 | 5/2018 | Shapiro | |
| 2018/0150047 A1 | 5/2018 | Shapiro | |
| 2018/0150055 A1 | 5/2018 | Shapiro | |
| 2018/0150058 A1 | 5/2018 | Shapiro | |
| 2018/0150062 A1 | 5/2018 | Shapiro | |
| 2019/0058870 A1 | 2/2019 | Rowell et al. | |
| 2019/0310604 A1 | 10/2019 | Shapiro et al. | |
| 2020/0064806 A1 | 2/2020 | Shapiro et al. | |
| 2020/0073362 A1 | 3/2020 | Shapiro et al. | |
| 2020/0089184 A1 | 3/2020 | Shapiro et al. | |
| 2020/0089185 A1 | 3/2020 | Shapiro et al. | |
| 2020/0125071 A1 | 4/2020 | Shapiro et al. | |

FOREIGN PATENT DOCUMENTS

| | | |
|---|---|---|
| CN | 101837517 A | 9/2010 |
| CN | 205958834 U | 2/2017 |
| CN | 106670656 A | 5/2017 |
| DE | 10 2014 214058 A1 | 1/2016 |

(56) References Cited

FOREIGN PATENT DOCUMENTS

| | | |
|---|---|---|
| EP | 0954125 A2 | 11/1999 |
| EP | 1309108 A1 | 5/2003 |
| EP | 2471625 A2 | 7/2012 |
| EP | 2808123 A1 | 12/2014 |
| JP | H03 254380 A | 11/1991 |
| JP | 04244347 A | 9/1992 |
| JP | 2002123306 A | 4/2002 |
| WO | WO-94/03302 A1 | 2/1994 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Gao, Rong et al. "Human-Machine Collaborative Workshop Digital Manufacturing." *ICICTA. 2010 IEEE.* May 11, 2010. pp. 445-448.

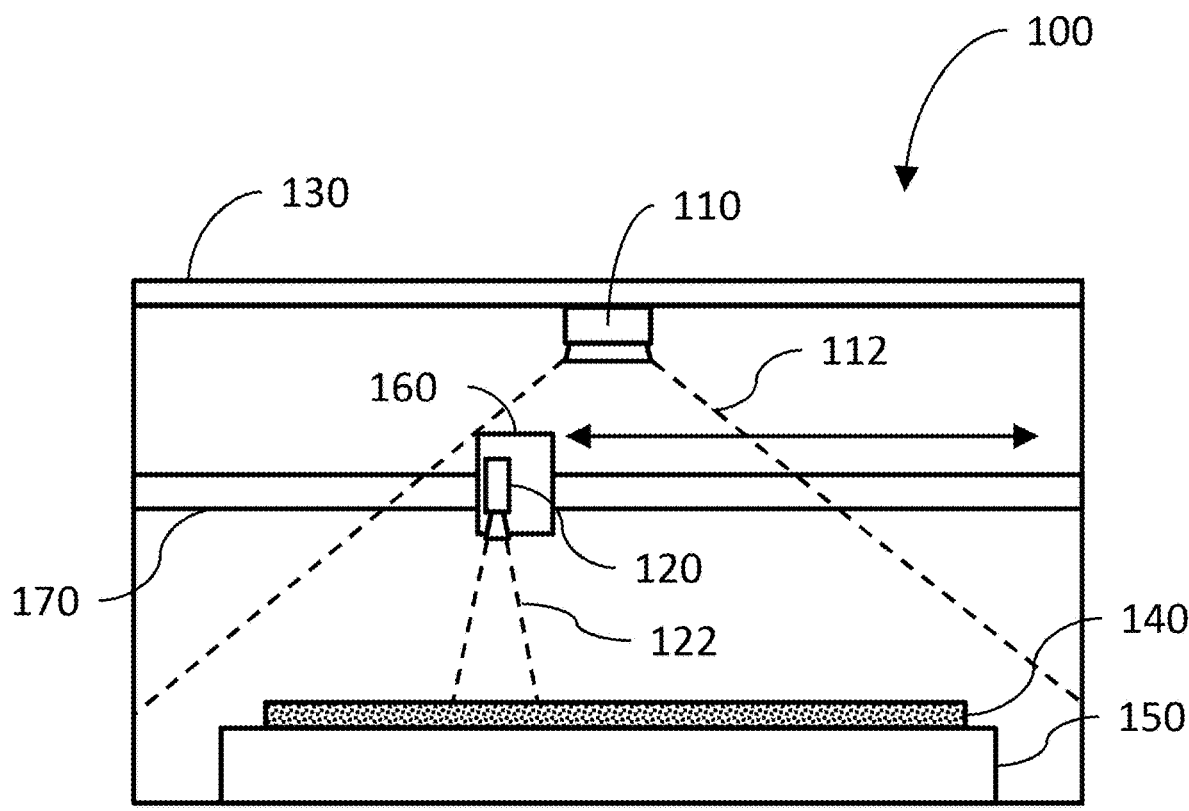
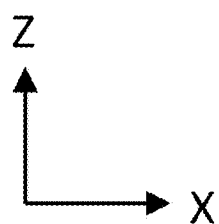
Fig. 1

Non-Uniform Resolution (1)

Non-Uniform Resolution (2)

Pulsing/Dragging (1)

Pulsing/Dragging (2)

Pulsing/Dragging (3)

Pulsing/Dragging (4)

Pulsing/Dragging (5)

Pulsing/Dragging (6)

Power Variation

Power Variation

Dithering (2)

Method for Optimized Dithering

Calculating, based on a laser spot on an image of the material, overlap of a laser spot on pixels of the image adjacent to a center of the laser spot, the overlap calculated in a direction of travel of the laser and based on a number of laser pulses delivered on the adjacent pixels at a laser speed and laser oscillation frequency.

1510

Generating a laser cross section profile based on a width of the laser spot and a height of a line made by the laser on the material.

1520

Applying, at the laser, a modification to a requested laser output based on the generated laser cross section profile and the overlap.

Optimized Dithering

Improved fidelity

Strike Modulation

Calibrating engrave depth

Multi pass with variable focus
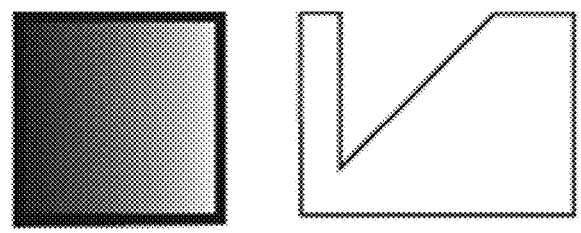
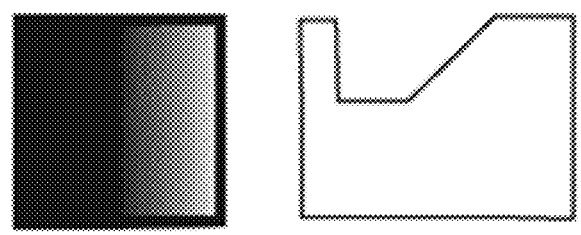
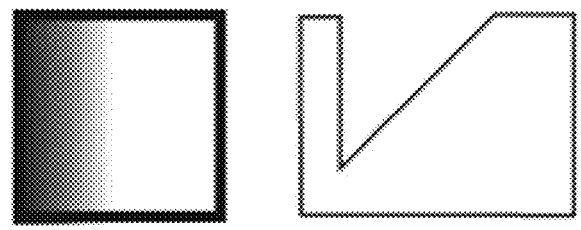
Fig. 20

Multi-Color Engraving

ENGRAVING IN A COMPUTER NUMERICALLY CONTROLLED MACHINE

CROSS-REFERENCE TO RELATED APPLICATION

This application is a Continuation of application Ser. No. 15/823,505 filed on Nov. 27, 2017, entitled "ENGRAVING IN A COMPUTER NUMERICALLY CONTROLLED MACHINE," which claims the benefit of U.S. Provisional Application 62/426,435 filed on Nov. 25, 2016, entitled IMPROVED ENGRAVING IN A CNC MACHINE" the disclosure of which are incorporated herein by reference in their entirety.

TECHNICAL FIELD

The subject matter described herein relates generally to computer numerically controlled machines and more specifically to techniques for controlling the output of computer numerically controlled machines.

BACKGROUND

Automated manufacturing systems, such as "3-D" printers, laser cutters, computer numerically controlled (CNC) machines, and/or the like, can be used to create objects with a level of detail and precision that defies traditional manufacturing techniques like moldings and/or manual assembly. Such automated manufacturing systems can operate based on instructions specifying, for instance, the cuts, layers, patterns, and/or the like that should be applied to a material. These instructions can be in the form of computer files transferred to the memory of a computer controller coupled with the automated manufacturing system. Furthermore, these instructions can be interpreted at runtime to effect a series of steps in the manufacturing process.

SUMMARY

In one aspect, a computer-implemented method includes receiving, at a computer numerically controlled machine comprising a laser, a motion plan based on a first image. The output of the laser can be dithered, according to the motion plan, to effect a change in the material within an interior space of the computer numerically controlled machine. The change substantially reproduces a portion of the first image on the material. The dithering includes providing laser energy to the material at a native resolution based at least on a spot size of the laser. Providing the laser energy includes determining the spot size based at least on parameters of the computer numerically controlled machine and properties of the material and limiting the delivery of laser energy to provide laser energy at locations separated by a distance no less than the spot size.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, improving or optimizing the resolution with which a CNC machine can reproduce images on materials placed in the CNC machine.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to systems and methods for surface feature production in a CNC machine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is an elevational view of a CNC machine with a camera positioned to capture an image of the entire material bed and another camera positioned to capture an image of a portion of the material bed, consistent with some implementations of the current subject matter;

FIG. 15 is a diagram illustrating optimizing laser output based on CNC machine parameters, consistent with some implementations of the current subject matter;

FIG. 20 is a diagram illustrating multi-pass engraving with a variable focus CNC machine, consistent with some implementations of the current subject matter.

When practical, similar reference numbers denote similar structures, features, or elements.

DETAILED DESCRIPTION

Figure 2:
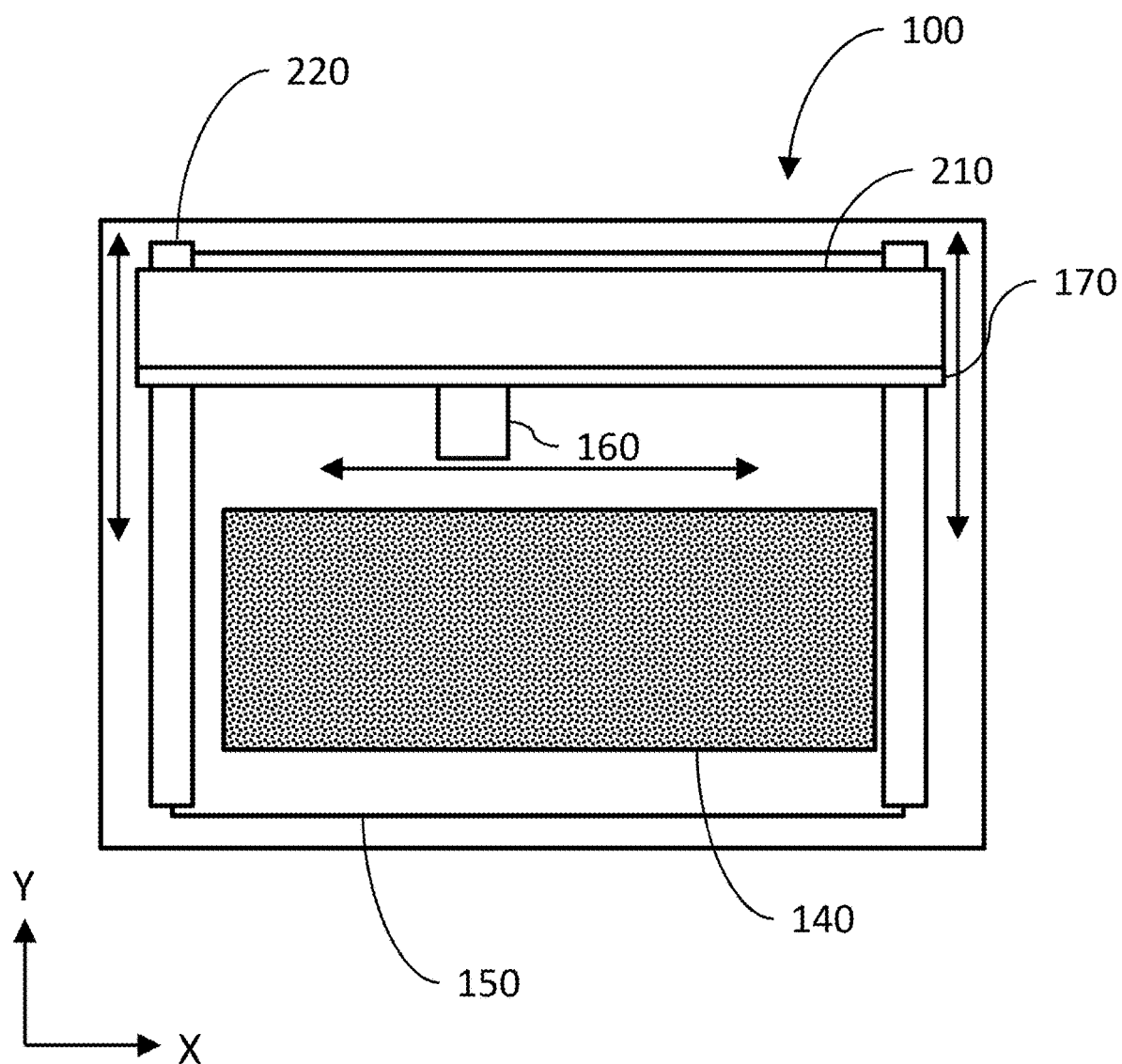
FIG. 2 is a top view of the implementation of the CNC machine shown in FIG. 1.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

Figures 3A, 3B, 3C:
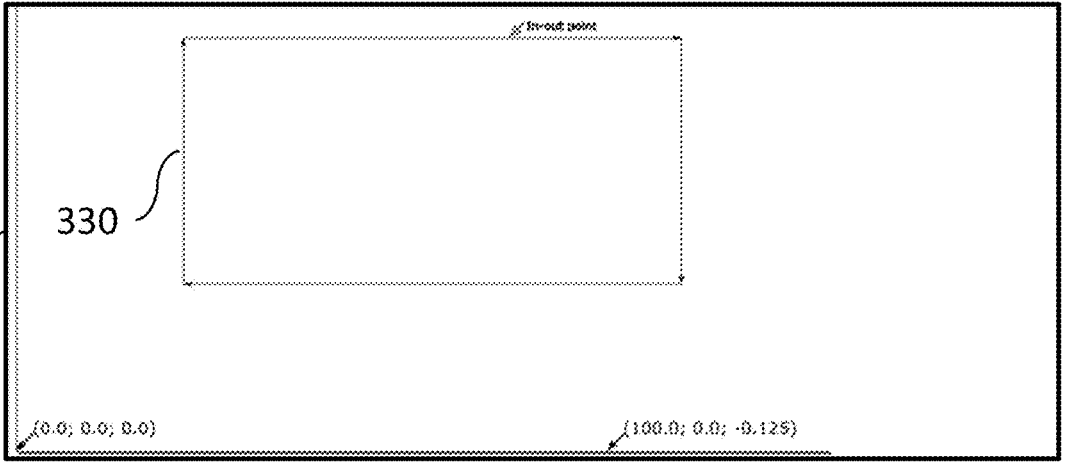
FIG. 3A is a diagram illustrating one example of an SVG source file, consistent with some implementations of the current subject matter.
FIG. 3B is an example of a graphical representation of the cut path in the CNC machine, consistent with some implementations of the current subject matter.
FIG. 3C is a diagram illustrating the machine file corresponding to the cut path and the source file, consistent with some implementations of the current subject matter.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG.

3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
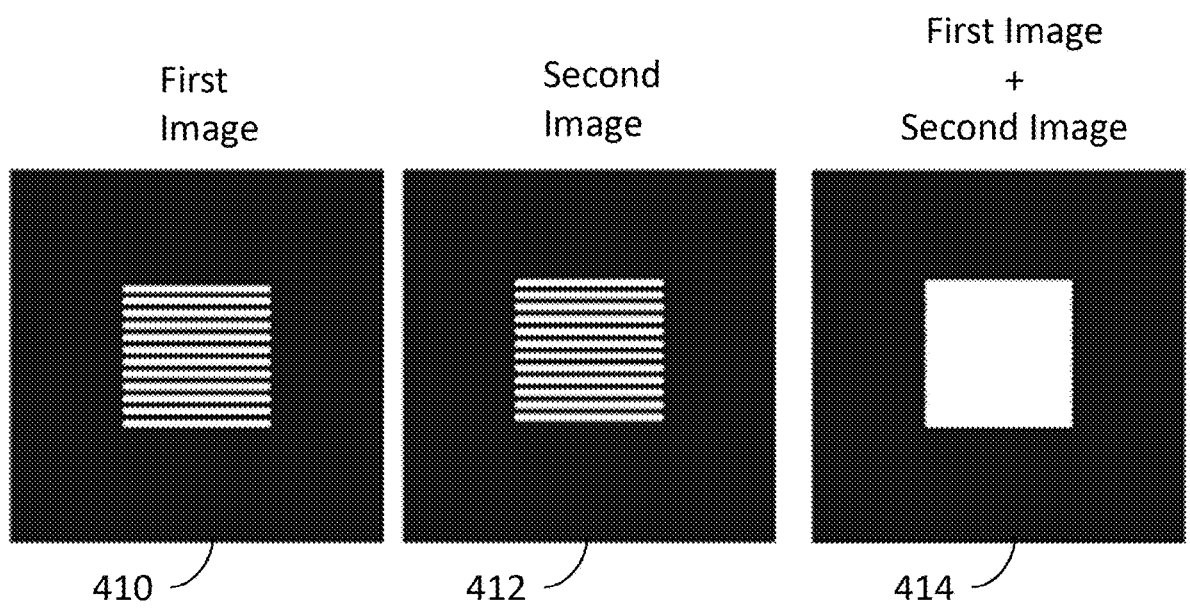
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
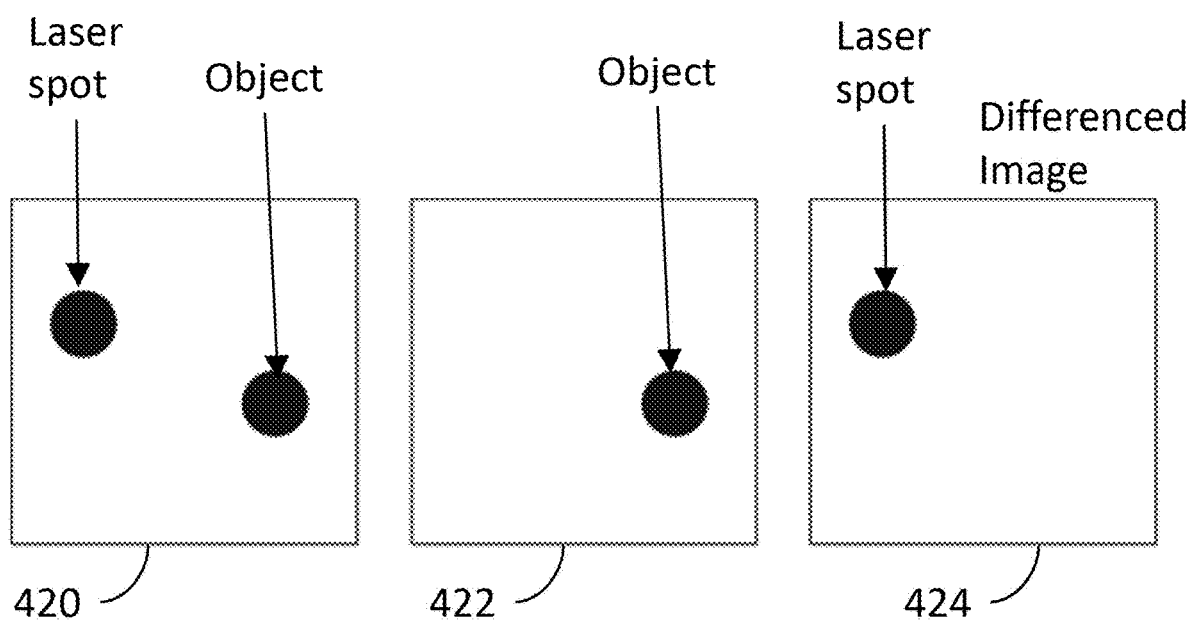
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
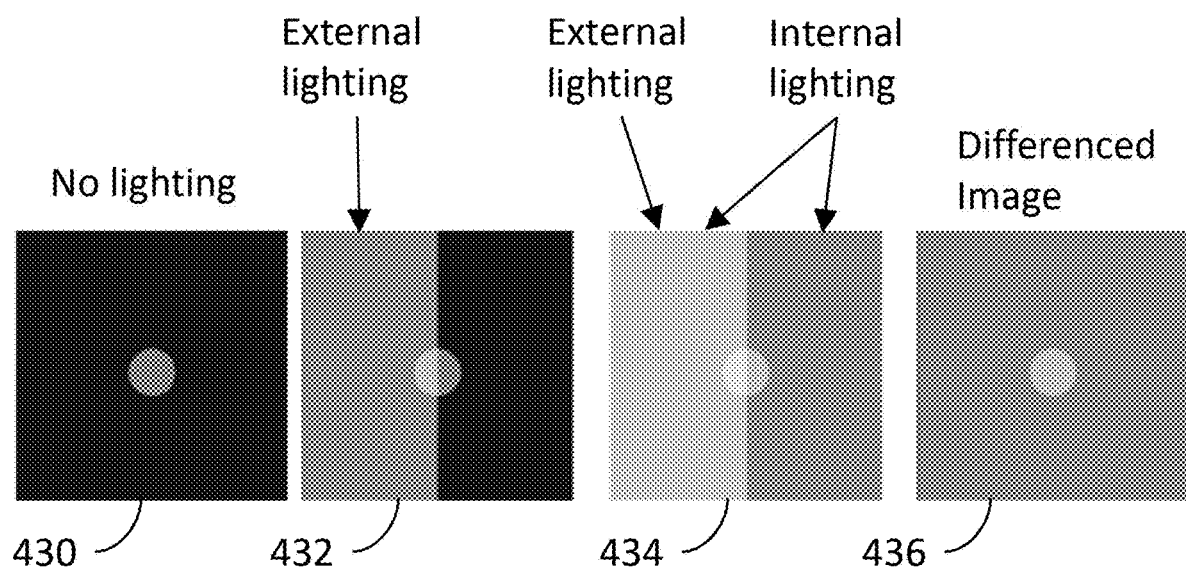
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $\frac{1}{60}^{th}$ of a second, or less than $\frac{1}{120}^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled.

For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Effective Resolution

Subtractive CNC machines can be equipped with tools that are designed to affect material change in their substrates. Examples include mills that can remove material via rotary action, water jets that can remove material through abrasive action, and lasers that can modify or remove material through deposition of electromagnetic energy. Such material modification can affect the optical properties, form, or visual appearance of the material, for example, darkening, causing shadows, engraving depth, causing a change in color or brightness, or the like. These modifications can be harnessed to modify the substrate material to create a desired visual result, for example, carving text into metal so it is readable, burning a photograph into wood so that it is recognizable as the original photograph, substantially reproduce a digital image or a visual feature on an object, or the like.

As used herein, the term "substantially reproduce" is not intended to describe an exact reproduction of an image or any particular constraint on the method or result of the reproduction. A "substantial reproduction" is intended to convey that the final product, or portion thereof, has features that are visually similar, in some way, to the image. For example, the image can be a color photograph of a person. The "substantial reproduction" of the image as an engraving on wood may represent the darkest areas only, creating a high contrast version of the image. In another example, the source might be a physical object such as a coin. The substantial reproduction may be a larger or smaller version of the coin. It may be engraved so as to have a different level of depth relief, either greater or lesser. The reproduction may be two-dimensional, but consist of material discolored to provide the appearance of the coin without any depth relief. Features like color or very fine graphical details may not be included in the reproduction based on the limitations of the material, the tool, the available resolution, or the like. In this way, the term "substantially reproduce," or its equivalents as used herein, are intended only to provide additional clarity to the systems and processes described without limiting the operations and features as expressly set forth in the drawings, description, and claims.

When considering the problem of reproducing an image with a CNC machine, it can be useful to consider the greatest level of detail that can be accomplished. As one example, consider an image that is composed of only two colors, for example black and white. In some cases, it can be desirable to have the source image capture the smallest possible details, by way of having the highest possible spatial resolution, so as to most accurately reproduce the source image.

In digital images, spatial resolution can be expressed in terms of pixel size, where a pixel is generally regarded as the smallest possible visual element that may be controlled by the system. Pixel size can depend on the limitations of the software generating the digital image, on the hardware used to display the image, or any combination thereof. Smaller pixels provide higher spatial resolution, and therefore greater possible detail. In some systems, horizontal resolution and vertical resolution can be unequal. In other systems, horizontal and vertical resolution can be equal, for example, having square pixels with a 1:1 aspect ratio. In digital images, there can be a restricted consideration of resolution: a given region is individually addressable, and may be turned on or off, usually without affecting nearby regions.

As used herein, the term "pixel" generally refers to a single visual element that is generally assumed to have a uniform quantity, for example, black or white, cut or engraved, engraved or not engraved, or the like. The term "pixel" is not intended to be exclusory of any particular condition or imply any particular dimension or property. For example, a pixel can have a partially scorched appearance due to a particular power setting (i.e. not necessarily fully scorched or lacking any scorching). As another example, a collection of pixels can have a uniform horizontal resolution but a varying vertical resolution (e.g. due to error in the CNC machine or intentionally introduced by software). For most purposes described herein, a pixel can be taken as a small visual element, typically rectangular, and having one or more properties (e.g. color, engraved, cut, scorched, or the like) to some degree. While the term "pixel" is predominately used herein, other terms can be used somewhat interchangeably, for example, dots, pels, picture elements, points, or the like. Accordingly, the term "pixel" should not be construed as limiting other than what is specifically described herein.

Non-Uniform Resolution

Figure 5:
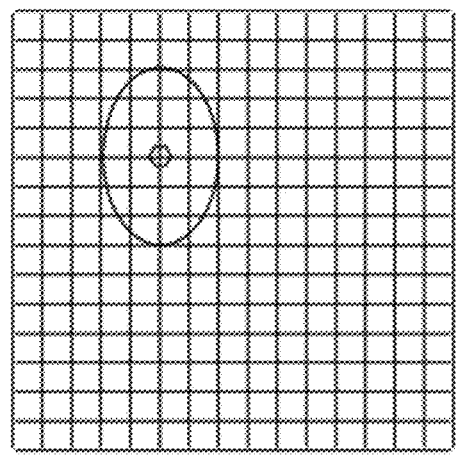
FIG. 5 is a diagram illustrating a spot size providing a non-uniform resolution of a spot created by the CNC machine, consistent with some implementations of the current subject matter.

FIG. 5 is a diagram illustrating a spot created by a CNC machine equipped with a laser, where the spot is oval shaped, consistent with some implementations of the current subject matter. In a CNC machine, the assumption that a given region is individually addressable may not hold true and the analogy to digital images may be imperfect. Consider the following example system and its associated limitations. The grid shown in FIG. 5 can represents a resolution of 0.1 mm with each small square having a dimension of 0.1 mm on a side. This resolution is provided only for the sake of example, and, and does not necessarily represent any physical properties of any particular CNC machine. Furthermore, the example resolutions described herein do not imply that any particular resolution is inherent or preferred in any particular CNC machine. In FIG. 5, the hexagon indicates the location of the tool-holding CNC head. In this example, the tool is a laser, and its beam shape is an ellipse, 0.6 mm high and 0.4 mm across. When the CNC machine is turned on for a period, for example 10 ms, and then turned off, the CNC machine modifies the material in the region covered by the beam shape. One model of resolution can indicate that the pixel size is 0.6 mm×0.4 mm, since that is the major and minor axes of the beam shape, and can correspond to the material affected by the beam.

Figure 6:
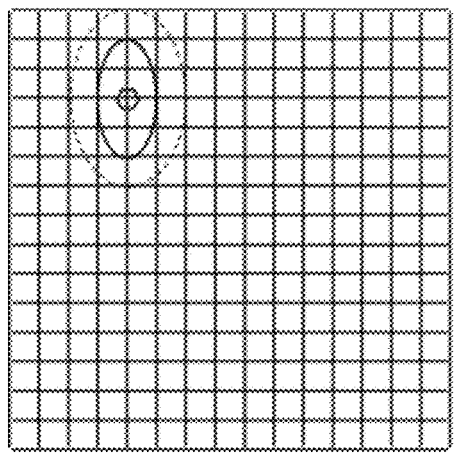
FIG. 6 is a diagram illustrating a second spot due to a varying beam energy distribution, consistent with some implementations of the current subject matter.

FIG. 6 is a diagram illustrating a second spot due to a varying beam energy distribution, consistent with some implementations of the current subject matter. While the beam, shown with the outer dotted line, is the same beam as show in FIG. 5, the affected area, shown with a dark line, is smaller than the spot in FIG. 5 due to non-uniform beam energy distribution and a shorter on-time or lower overall beam power, consistent with some implementations of the current subject matter. This might occur when a beam as in FIG. 5 is used, but for a shorter duration and/or at a lower power, if the beam energy was not be evenly distributed across the ellipse. For example, when the distribution of energy is Gaussian (meaning peaked at the beam center and tapering outward according to a mathematical function approximating a normal distribution), then brief periods of laser energy may provide only enough energy to affect the material at the center of the beam. Furthermore, assume that the briefest period that the laser may be turned on is 1 ms. When the laser is turned on for 1 ms, in this example, only the center of the beam where the power is densest deposits enough energy to effect the material, so the spot size can be considered to be 0.4 mm×0.2 mm. Because the laser was only on briefly, this can provide a different, smaller effective pixel size than the total beam size and thus higher resolution value.

However, this higher resolution value cannot be achieved if slower processing speeds are used, since the longer exposure time would allow the weaker perimeter of the beam to affect the material. Those slower processing speeds may be needed for secondary purposes—for example, deeper engrave depth, or a causing darker tone in the underlying material. In those cases, the smaller spot size and higher resolution may be unavailable unless other means are used to reduce the energy delivered per unit time, such as reducing beam power.

As used herein, we can refer to the time required to cause a certain desired change in the material as the "effect time." The effect time can depend upon the properties of the beam and the properties of the material, as well as related properties such as the rate of cooling. This is distinct from "activation time," which as used herein, is only a property of the CNC machine (e.g. how long it takes turn the laser on.) For example, at a given beam power, wavelength, energy distribution, focal size, spot shape, and so on, the effect time to accomplish a visible discoloration 0.2 mm across on clear acrylic might be 2 ms. In this example, because the beam energy profile is lower at the edges of the beam, then the material actually affected by the beam after 2 ms is smaller than the beam spot size. However, the effect time to accomplish a 0.4 mm spot size as in FIG. 5 might be 10 ms, allowing the full perimeter of the beam to affect the material, even the lower powered outer region.

Pulsing/Dragging/Dragging Time Technique

Figure 7A:
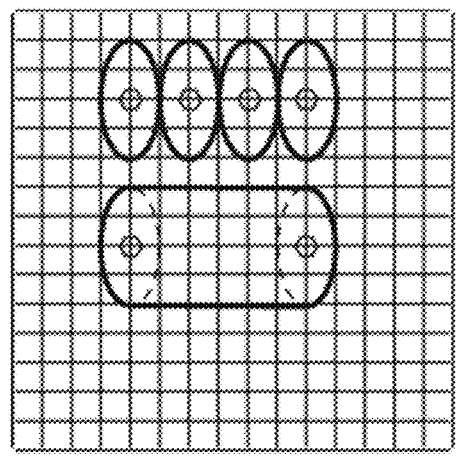
FIG. 7A is a diagram illustrating a pulsing technique and a dragging technique, consistent with some implementations of the current subject matter.

FIG. 7A is a diagram illustrating two methods for creating the visual appearance of a straight line, a pulsing technique and a dragging technique, consistent with some implementations of the current subject matter. In a digital image, visual images can be formed by interpreting adjacent pixels as "on" or "off." For example, a series of adjacent pixels that are "on" can appear as a line. However, in the case of a laser, CNC milling machine, or water jet, there are two notable techniques for activating adjacent regions. In the first technique, the CNC machine, laser, or the like, is activated, deactivated, moved, then activated and deactivated again, repeatedly (as shown in the upper portion of FIG. 7A). As used herein, "activated" generally refers to turning on a laser, striking with a water jet, contacting the material with a drill bit, or the like. This can be referred to as the "pulsing technique." In the second technique, the CNC machine can be activated, moved, and then deactivated (as shown in the lower portion of FIG. 7A). This will be referred to as the "dragging technique". It should be noted that other variations are possible as well, including but not limited to pulses that overlap, pulses that contain small amounts of vertical or horizontal displacement, and so on. If the dragging technique is used but the tool activation period is so short that the motion of the tool while activated is small compared to the motion of the tool while deactivated, then this version of the dragging technique becomes similar to the pulsing technique.

Figure 7B:
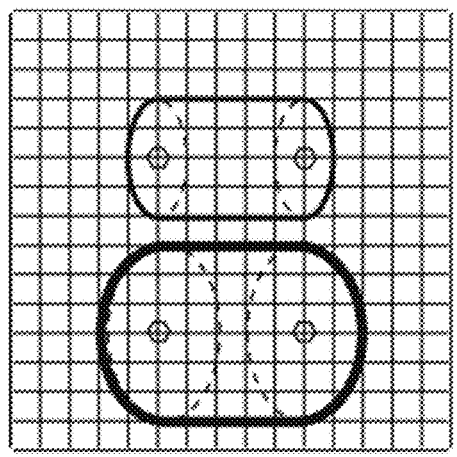
FIG. 7B is a diagram illustrating two lines created with the dragging technique, where a faster speed is used to create a narrower line, consistent with some implementations of the current subject matter.

FIG. 7B is a diagram illustrating two lines created with the dragging technique, where a faster speed is used to create a narrower line, consistent with some implementations of the current subject matter. As previously mentioned, the activation time can affect the minimum region of material changed by the beam. This affects both pulsing and dragging techniques. The dragging technique, for example, when moving a laser beam quickly and/or at lower power (as shown in the upper portion of FIG. 7B) may produce a smaller affected region than moving it slowly and/or at higher power (as shown in the lower portion of FIG. 7B) because the beam is not depositing sufficient energy on the material in the time it is in contact to cause the change at the outer perimeter of the effected region where the laser power is lower due to the Gaussian power distribution.

Figure 8:
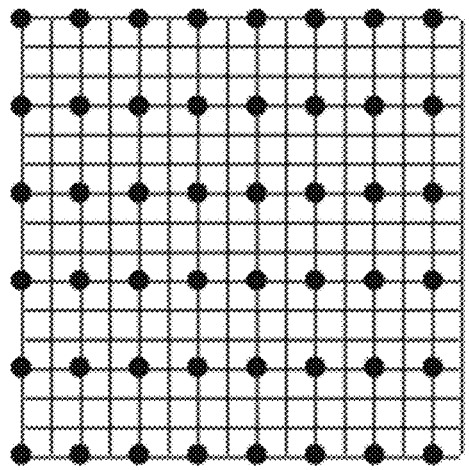
FIG. 8 is a diagram illustrating locations where a CNC machine can position its tool head, consistent with some implementations of the current subject matter.

FIG. 8 is a diagram illustrating locations where a CNC machine can position its tool head, consistent with some implementations of the current subject matter. Another difference between resolution as considered in computer graphics applications and the notion of resolution on a CNC machine is that the positioning resolution of the CNC tool can be different than the spot size and, like the spot size, may differ in horizontal and vertical resolution. Positioning resolution describes the locations at which the tool may be located in a stopped position (as used in the pulsing technique, or any time the motion of the head is arrested). For example, the CNC machine might be able to position the tool (e.g. the laser head) within 0.2 mm. This could occur when, for example, the system uses stepper motors and 0.2 mm is the distance between steps, or when the signal sent to the movement system cannot encode spacing smaller than 0.2 mm. In some implementations, the horizontal and vertical resolution can be different. This can occur, for example, when the mechanical system for the vertical position is not identical to the horizontal. In this example, it may be possible to position the head horizontally with a precision of 0.2 mm, but vertically with only a precision of 0.3 mm. In the example of FIG. 8, the black dots represent the locations where the tool can be positioned, and the tool cannot be stopped at an intermediate position.

In some circumstances, it may be that the dragging technique produces visually different results than the pulsing technique. This may be because of the different shape of material affected (a tube-shape instead of a row of dots), or because the laser behaves differently in steady-state versus when the tube initially strikes. Based on the user's goals, it may be optimal to use pulsing vs. dragging.

Figure 9:
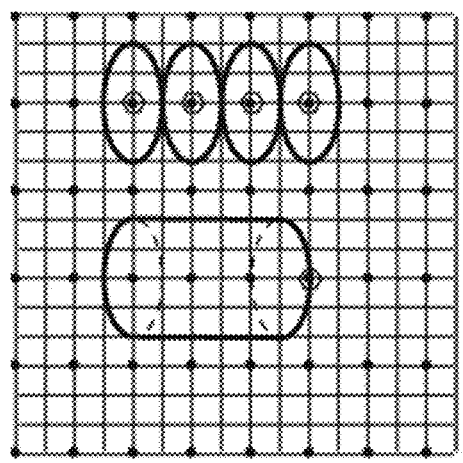
FIG. 9 is a diagram illustrating deactivation of the laser while moving to increase resolution compared to the available resolution when the laser is pulsed, consistent with some implementations of the current subject matter.

FIG. 9 is a diagram illustrating deactivation of the laser while moving to increase resolution compared to the available resolution when the laser is pulsed, consistent with some implementations of the current subject matter. However, as noted above with reference to FIGS. 7A and 7B, when using the dragging technique, pixels can be activated not only while the tool is stopped, but also while the tool is moving. For example, the laser can be activated or deactivated as it transits between two points. This can increase the possible resolution in the direction of the head travel, but not necessarily in any direction transverse to the direction of travel. For example, if the head is moving left to right, the pulsing technique (shown in the top portion of FIG. 9) is limited to, in this example, horizontal precision of 0.2 mm. However, the dragging technique (shown in the bottom portion of FIG. 9) can allow the horizontal motion to achieve greater precision by disabling the tool before motion has completed. In this example, the tool was disabled halfway before the final 0.2 mm step is traversed. This will be referred to as the "dragging time technique."

Figure 10:
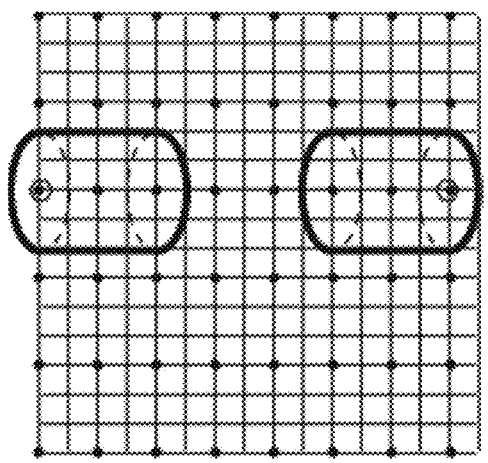
FIG. 10 is a diagram illustrating minimum activation and deactivation times, consistent with some implementations of the current subject matter.

FIG. 10 is a diagram illustrating minimum activation and deactivation times, consistent with some implementations of the current subject matter. In another example of how CNC machines differ from standard bitmap displays, some CNC machines can have minimum activation or deactivation times. For example it might adversely affect the life of a laser if it is turned on for a duration shorter than 4 ms, or if it is turned off for a period of less than 6 ms before reactivation. That can impose restrictions on the minimum region of material that is either affected or unaffected. Those restrictions can also depend on the speed of the tool head. For example, given the prior restriction, if the head is moving at 1 mm/s, then the CNC machine using the dragging technique may not create a continuous line shorter than 0.4 mm. Once the tool has activated, it may stay on indefinitely, but given the second restriction, the tool may not begin a new line until at least 6 ms and 0.6 mm have gone past. Note that the distances describe exclude the additional size of the beam spot itself. In the example shown in FIG. 10, the smallest on-off pattern that can be drawn is illustrated.

Figure 11:
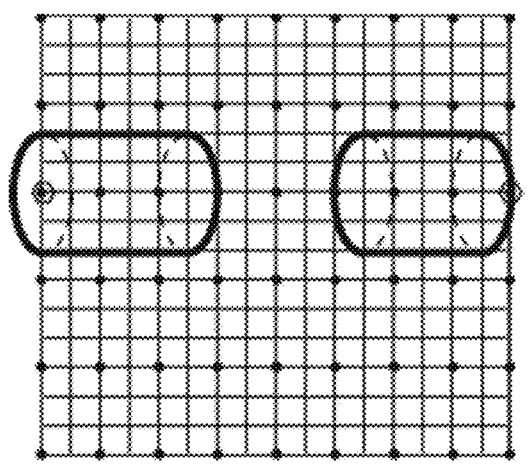
FIG. 11 is a diagram illustrating deactivation of the laser after a minimum activation time, consistent with some implementations of the current subject matter.

FIG. 11 is a diagram illustrating deactivation of the laser after a minimum activation time, consistent with some implementations of the current subject matter. As mentioned above in the dragging time technique, however, the lines do not need to follow the minimum positioning increment, since as long as the minimum on times are held, the tool can disengage (or laser stop firing) after a slightly longer time (e.g. 5 ms instead of the minimum of 4 ms), where the increased length is less than the positioning resolution of 0.2 mm. In this case, the first line is 0.5 mm long, while the spacing and second line remain the same size. These same techniques can be used when the direction of motion is in a different direction; if the direction of motion is vertical or diagonal, the same theory can be applied.

For all these reasons, there is no singular way to define the "resolution" of a CNC machine as one can the resolution of a computer bitmapped display. The CNC machine may have different horizontal and vertical resolutions, the minimum pixel size that can be affected/cut/engraved can depend on whether it's on or off, the accuracy can depend on the direction of motion, the spot size of the affected area can be much larger than its positioning accuracy, and many other considerations. For the purpose of semantics, though, we can talk about relative resolving power—for example, increasing the step size on the vertical axis can decrease the vertical resolving power but does not affect the horizontal resolving power. While the resolving power in a particular direction can be independent of the resolving power in at least one other direction, in some implementations, the instantaneous resolving power can be a combination or convolution of the multiple resolving powers. In this way, the techniques described herein can be applied in any combination specified by the machine file or motion plan.

Image Reproduction

Subtractive CNC tools can modify or remove material to achieve a shade, tint, coloration, shadow, reflection, or other visible treatment to create a visible image. For example, a CNC mill can create a divot or a trough with a milling machine. In the case of a CNC laser cutter and engraver, a variety of effects are possible from the light, its heat, and its secondary effects. These include, but are not limited to, removing material via combustion or vaporization, which can leave an area that is visibly absent, creating a shadow or depth that has a visual effect, causing a reaction in metal, such as oxidation formation in titanium, that creates a color, charring the surface of a material, such as wood, to darken it, causing microfractures, which diffuse light, in the surface of glass, and the like. Some materials can allow for many gradations of color depending on the duration and amount of heat applied, while others can allow for only an affected region and an unaffected region. For example, some forms of sandstone turn black with the application of a certain amount of energy, then white with the application of further energy, but no further changes are possible. In another example, glass microfractures can be either present or absent. Increasing the amount of laser energy does not increase the opacity, but rather can increase the affected region, effectively increasing the spot size, up until damage to the glass substrate begins to occur.

While some images can be purely black and white, some images can be greyscale or color. In some cases, it can be desirable to reproduce images with the highest fidelity possible. In some implementations, the image can be downsampled to an available color palette. Three exemplary processes for improving image reproduction with a CNC machine are described below.

Power Variation

Figure 12:
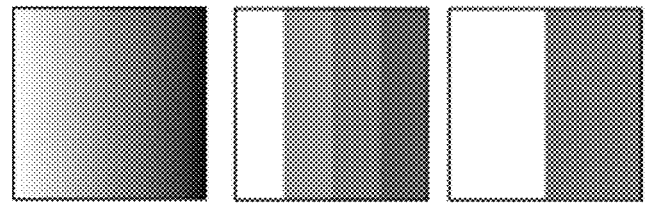
FIG. 12 is a diagram illustrating generating patterns by varying laser power, consistent with some implementations of the current subject matter.

FIG. 12 is a diagram illustrating generating patterns by varying laser power, consistent with some implementations of the current subject matter. Some implementations can include a first approach where the tool (e.g. the laser, drill bit, water jet) can be continuously modulated to produce a visual effect as close as possible to the source image at each spatial location. The tool modulation can affect the material in different ways, with a result that can approximate the original artwork. For example, with a laser, in some woods, given a constant exposure time, a lower power setting will result in a light-brown mark while a higher power setting will result in a dark-brown mark. In this example, the darkest pixels in the digital source image would cause the laser to use the highest power setting, lighter pixels using another power setting, and the lightest pixels turning the laser off.

Here, given a source image of a white-to-black gradient (shown in the leftmost image in FIG. 12), the power variation method used with the laser can produce three shades of brown on wood (shown in the middle image in FIG. 12), or a white area and a frosted area on glass (shown in the rightmost image in FIG. 12).

In other implementations, a low power laser beam can remove a small amount of material, creating a visual effect from a small depression, while a high power laser beam can remove a larger amount of material, creating a visual effect from a deeper depression. A similar effect can be found by moving a cone-shaped mill bit up and down, milling deeper or more shallow furrows.

In another implementation, a laser may be used at varying power levels to remove more or less material, resulting in a surface that varies in height.

As used herein, the term "modulation" can include any variation, change, or adjustment of a quantity, setting, output, signal, or the like. The variation or "modulation," is not to be considered limiting and does not imply any specific pattern, waveform, periodicity, duty cycle, effect, or the like, unless explicitly stated.

Speed Variation

Some implementations can include a second approach where the speed of travel can be modulated. For some tools, like a laser, dwelling in an area or location for a longer time can produce a result similar to using more laser power, above. Speeding up can have a similar effect to lowering the power. However, it can difficult to achieve detail with this approach, since the inertia of the tool limits the rate at which speeds can be changed. Therefore, this is rarely used. Instead, the inertia of the tool, laser head, or the like, can be accounted for as the inertia can limit the rate at which a speed can be changed. In other implementations, the speed of travel can be chosen to account for the use of a power variation technique and/or a dithering technique (discussed below).

Dithering

Figure 13:
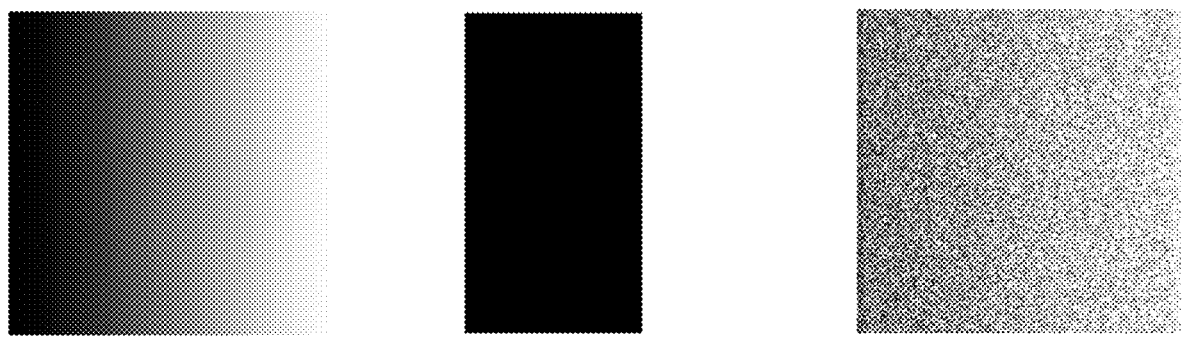
FIG. 13 is a diagram illustrating dithering, consistent with some implementations of the current subject matter.

FIG. 13 is a diagram illustrating dithering, consistent with some implementations of the current subject matter. Some implementations can include a third technique to achieve the appearance of a greater range of colors by taking advantage of the available resolution. This third technique can be described as dithering. Dithering can include introducing noise to the image before calculating the target color, allowing the result to better approximate the source image. For example, in the gradient (shown in the leftmost image in FIG. 13), a thresholding technique to map greyscale pixels to black and white output can result in a square where the left half is black and the right half is white (shown in the middle image in FIG. 13). By contrast, if noise is introduced and a randomly-chosen selection of pixels is either brightened or darkened before thresholding each picture to pure black or pure white, the image on the right appears (shown in the rightmost image in FIG. 13). This can be referred to as random dithering.

Other dither algorithms can be used instead of and/or in addition to random dithering including, for example, ordered dithering, patterning, and/or the like. It should be appreciated that while these algorithms may achieve a better resolution, they can also create noticeable patterns in the output.

An improved class of dither algorithms can achieve higher reproduction quality and lower pattern noise through error diffusion. One example of a diffusion dithering algorithm is Floyd-Steinberg dithering. To apply a diffusion dithering algorithm, a first pixel is chosen—typically the top left—and a threshold is applied, thereby changing the pixel color to the nearest color in the output palette. Then the error, which corresponds to a difference between the original pixel and the final pixel, can be calculated. That error is assigned to one or more nearby pixels whose color has not yet been thresholded. For example, if the first pixel is 49% black, then the output pixel chosen is white, and the 49% error is assigned to the nearby pixels. As a result, adjacent pixels that are 49% black would instead become 100% black, since these pixel would inherit the "not enough black" error of their neighboring pixel. It should be appreciated that diffusion dithering algorithms can be extremely sensitive to the process by which error is assigned to nearby pixels.

Figure 14:
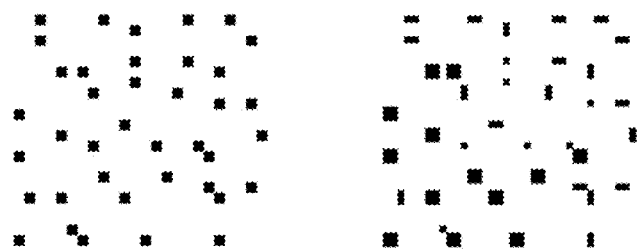
FIG. 14 is a diagram illustrating the results of resizing a dithered pattern, consistent with some implementations of the current subject matter.

FIG. 14 is a diagram illustrating the results of resizing a dithered pattern, consistent with some implementations of the current subject matter. In some implementations, dithering can limit the ability to resize an image. That is, while the image can be resized before and/or during the dithering process, a dithered image is optimized for exactly one resolution. In such cases, any attempt to resample the dithered image can result in significant loss of fidelity—even if the resampling is to increase the resolution, which would normally be beneficial or at least easily compensated for had the dithering not occurred. For example, (shown in the leftmost image in FIG. 14) the image is a square of 5% grey (very light). In the middle image in FIG. 14, it is diffusion dithered at 25×25 pixel resolution. The image on the right in FIG. 14 is the same 25×25 image resampled to a higher resolution: 37×37 pixels (or 50% higher resolution). In this example, instead of having the widely-dispersed single pixels of the properly dithered algorithm, quadrupled and doubled pixels are shown, which results in a coarser appearance. Note further that the lower-left corner of the resized dither pattern appears darker than the upper-right, when in fact the black pixels should be uniformly distributed.

Therefore, in some cases, it may be desirable for the image to be dithered to the final resolution at which the image will be rendered. This, of course, can be challenging for some CNC machines, because as previously noted "resolution" can vary across different CNC machines, and may not be easily expressed. For instance, optimal dithering based on spot size may be different from optimal dithering based on positioning resolution. The best strategy, therefore, depends on a host of factors including the desired result, machine parameters, material being used, and more.

Due to the complexity of expressing intention, machine parameters, and/or the like, images are typically not dithered at an optimal resolution considering all constraints. Instead, one of a few simple choices is requested such as, for example, a vertical resolution and/or a horizontal resolution (e.g., 300 or 600 pixels per inch). Image processing software is typically used to dither to this resolution. Then the image is sent to the CNC machine, which resamples it to a resolution that the machine can support, which typically is the positional resolution of the machine. Resampling to the positional resolution of the CNC machine can introduce errors while forgoing the opportunity to achieve better image quality by operating at the highest possible resolution.

Optimized Dithering

FIG. 15 is a diagram illustrating optimizing laser output based on CNC machine parameters, consistent with some implementations of the current subject matter.

In some implementations, a dither pattern can be optimized based on the physical limits of the CNC tooling system, including some or all of the parameters that affect the dithering output, such as those listed above. Parameters can include, for example, tool spot size, tool spot shape, the material being processed, the number of colors or shades the material can display, the speed at which the tool will move, the power, depth, or other tool settings being requested, whether the pulse or drag technique will be used, the horizontal positioning resolution (which may be a function of the tool, speed, and other factors), the vertical positioning resolution, any delays in changing tool parameters (e.g. minimum on-time, off-time, or transition times between power states), the number of passes the laser will take, the focus settings and material surface height, and so on. The dithering algorithm can also take, as inputs, information that may affect the appearance of the output. These inputs can include, for example, the color depth and resolution of the original image, the style of the source image (e.g. if it is a photograph or line art), whether the user instructs the surface to be marked to a uniform or variable depth (if supported by the material), if the user would prefer a darker or lighter result, if the user intends for dark areas to have more material removed (i.e. 'carved') or simply to have a darker final appearance to mimic the source, and more. The algorithm can also compute operating parameters and output them. For example, the algorithm can recommend that to achieve the desired level of engrave depth in the material selected, a slower speed and denser dot pattern be used.

One implementation can include a method as shown in FIG. 15. In this example method, a greyscale image can be dithered by taking into account various parameters including, for example, the number of pulses per second, the speed of the head, the number of lines per inch (i.e., the amount that the tool will advance after each X line), the physical width of the laser pulse, and the maximum frequency at which the laser can oscillate on and off. In some implementations, the software might accept other parameters, for example the number of shades of grey available. In yet other implementations, the software can output required settings such as, for example, the speed necessary to achieve a requested horizontal resolution.

In the implementation shown in FIG. 15, at 1510, based on a laser spot on an image of the material, an overlap of a laser spot on pixels of the image adjacent to a center of the laser spot can be calculated. The overlap can be calculated in a direction of travel of the laser and based on a number of laser pulses delivered on the adjacent pixels at a laser speed and laser oscillation frequency.

At 1520, a laser cross section profile can be generated based on a width of the laser spot and a height of a line made by the laser on the material.

At 1530, at the laser, a modification can be applied to a requested laser output power based on the generated laser cross section profile and the overlap.

The modification can be to at least one of a laser speed, and a laser spot size. Also, the generated laser cross section profile can be a Gaussian oval. The Gaussian oval can have a height dimension and a width, where the power distribution along the height and the width are both Gaussians having a full-width, half-maximum corresponding to the height and the width.

Figure 16:
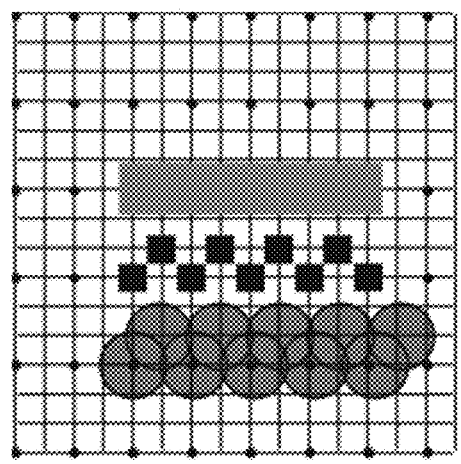
FIG. 16 is a diagram illustrating optimizing output resolution of the CNC machine, consistent with some implementations of the current subject matter.

FIG. 16 is a diagram illustrating optimizing output resolution of the CNC machine, consistent with some implementations of the current subject matter. As one example, the above technique can be applied to dither an image on glass with a laser. The surface of the glass can be modified by the laser beam anywhere the beam touches it for a sufficient period of time. Additional beam exposure will not change the image but may damage the glass. In this example, there can be a positioning resolution of 0.1 mm and a laser spot size of 0.2 mm. Furthermore, a pulsing technique may be used to dither the image instead of a dragging technique. In this case, using the highest possible positioning resolution (e.g., 0.1 mm pixels) may be undesirable. An attempt to dither a 50% grey image (shown in the upper image in FIG. 16) should produce alternating pixels (shown in the second image down in FIG. 16). However, this may be impossible at the highest positioning resolution when the laser spot size is larger and circular. Since the spot size is large, using alternating on/off pixels at very high resolution would cause each "on" pixel to cover half of each adjacent "off" pixel, resulting in a 100% covered surface, as opposed to the 50% covered surface that is desired (shown in the third image in FIG. 16). So in this example, knowledge of the material and the beam size can indicate that the positioning resolution of the CNC machine should be approximately 0.2 mm pixels (the fourth image of FIG. 16). However, because the spot size is not in fact a perfect square, this spacing may yield an incorrect tone because light areas may outnumber dark areas. This can be accomplished by alternating spacing so that, on average, half as much area is darkened as lightened (the fifth image of FIG. 16). If, however, the positioning resolution of the laser was in fact 0.09 mm pixels instead of 0.1 mm, then a native resolution of 0.18 mm might be chosen to match that physical constraint. However, this would make the image darker overall as the ratio of positioning resolution to spot size had changed. To compensate for this, the dither algorithm could either lighten the image by an appropriate amount before dithering, or, if using an error diffusion algorithm, accumulate extra error at each pixel reflecting the extra "darkness" that arise due to pixel overlap. This results in a more accurate image.

Figure 17:
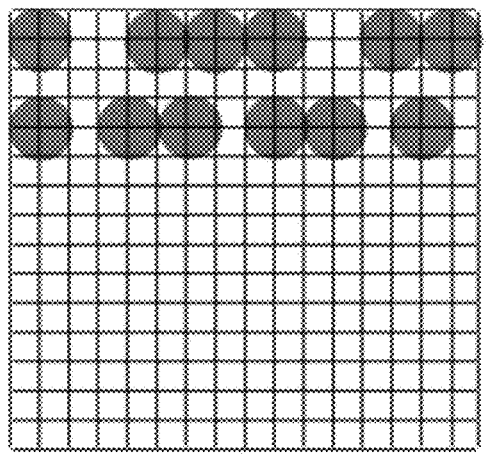
FIG. 17 is a diagram illustrating a dithering pattern with improved visual fidelity, consistent with some implementations of the current subject matter.

FIG. 17 is a diagram illustrating a dithering pattern with improved visual fidelity, consistent with some implementations of the current subject matter. If the user desires to create a dither pattern with a mix of regions that have been affected by a tool (e.g., a laser) and regions that have not been affected by the tool, a basic approach may be to utilize a resolution that enforces a 1:1 ratio between areas affected by the tool and the allowable positioning accuracy of the tool, even if the tool is capable of greater positioning accuracy. This approach can obviate the problem observed in the third row of FIG. 16. For example, in the simple case of a tool that creates a square of dimensions A×A, where the user wishes to be able to accurately reproduce all shades of grey via a dithering algorithm equally, the dithered image might be prepared at a resolution of 1/A dots per inch both horizontally (e.g., along the x-axis) and vertically (e.g., along the y-axis). However, the visual fidelity may still be improved. For instance, if additional positioning resolution is available, dots might be permitted to be spaced more closely. Instead of using the dot width as the resolution, causing either adjacent dots or large gaps, the algorithm might place the dots as close together as the positioning resolution would allow when a darker shade is desired. While the top image of FIG. 17 demonstrates the first approach, where every 0.2 mm area must be either on or off, the bottom image demonstrates how, while "on" dots must be widely spaced so as not to overlap and risk material damage, the gaps between them may be smaller, allowing the eye to more seamlessly blend the dots into a smooth grey.

In another implementation, the dimensions of the dot itself may be considered. Since it is not a perfect square, a region "filled" with a dot is still left partially unmodified by the tool. This can be addressed by staggering the dots for a complete fill when one is desired, or when precise ratios of affected and unaffected material are required for accurate reproduction of a shade of grey, calculating the amount of material left unaffected when a region is turned on, and turning on additional regions to compensate. This can be used as an error signal in an algorithm that tracks error in dithering such as Floyd-Sternberg, thereby improving the accuracy of the greyscale reproduction.

In another implementation, the dithering algorithm may opt for a combination of the pulsing technique and dragging technique; for example, when a large dark region is required, it may be more time efficient and provide less wear and tear to turn on the tool and drag it along the material rather than to pulse it at adjacent locations across the material. In other cases, where the tool spot size is being precisely controlled, it may be undesirable to drag and create a line, when pulsing can create a known beam spot shape.

Figure 18:
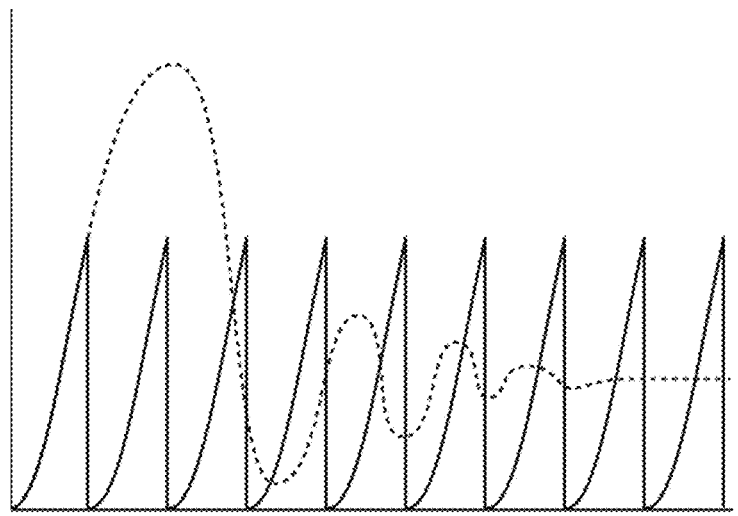
FIG. 18 is a diagram illustrating a strike modulation technique, consistent with some implementations of the current subject matter.

FIG. 18 is a diagram illustrating a strike modulation technique, consistent with some implementations of the current subject matter. FIG. 18 is a diagram of a tool's response to a request for a fixed level of material modification, graphed on the Y axis, versus time, graphed on the X axis, for two different settings, plus a third alternate means of accomplishing a lower-power setting. A special consideration is that some tools are not able to immediately deliver the requested level of material modification. FIG. 18 shows a graph of a tool that has been requested to provide a specified level of material modification ability but exhibits a ringing, overshoot-and-correction response when asked to do so, such as a mill that overshoots and corrects its Z-axis position, or a laser tube that is requested to provide a specified power level and exhibits ringing above and below the power level. In some cases, such as with laser tubes, the initial rise in power levels may be more rapid and predictable than the subsequent power variation. It can be useful, therefore, to limit on-time in either the pulse or drag techniques mentioned above to durations which do not exceed the first peak of the power response, allowing for extremely accurate low power operation by creating, in effect, a power source that can be pulse width modulated and that can be tuned from anywhere between zero and a fraction of peak power, the fraction being dependent on the curve of the initial power rise, as measured and accounted for in calculating the delivered energy per pulse. This technique will be called strike modulation. In FIG. 18, we see an attempt to request a low power setting from the tool which overshoots and rings (dotted line) and an alternate strategy in which the tool is briefly pulsed on and off (solid lines) so the average power is the desired low-power setting.

In some implementations, it is desirable to deliver varying portions of power to different regions of material. In one example, the material may react differently to different power levels, for example, by darkening more when more power is applied. In another example, the user may desire to create a variable-depth engraving with higher and lower regions, which may be accomplished by adjusting the power delivered to different regions based on the source design file. In these cases, a much higher resolution is acceptable, since partial overlapping of the tool-affected region is acceptable and even desirable, unlike the engraving-on-glass example above. In this case, it may be desirable to dither to the positioning resolution of the CNC tool. When the power is delivered in pulses (e.g., the pulsing technique), that means spacing the dots as closely together as possible. Alternatively and/or additionally, when the power is delivered via the dragging technique, that means that adjacent rows (e.g., adjacent horizontal rows when the dragging motion is horizontal or adjacent vertical rows when the dragging motion is vertical) will be spaced as close together as possible, allowing for additional resolution by overlapping rows with only a small offset. This technique pairs well with strike modulation. While strike modulation limits the power available to only a fraction of peak, overlapping or repeating rows can allow for the delivery of an equal and/or greater quantity of energy while providing extremely high spatial resolution and fine control over power delivered.

Dithering to Engrave

Some CNC machines, such as lasers, are optimized for on/off transitions and can therefore take longer to transition between intermediate power states. For example, they might be able to quickly create a stairstep of 0.3" at a given speed by transitioning from 0% power (off) to 100% power (full), but have a harder time creating a stairstep from 0.1" depth to 0.2" depth, because transitioning from 33% power to 67% power requires a longer period time. This could manifest itself as a ramp instead of a stairstep, for example.

However, high-resolution dithering can create accurate depth engravings in the same way that variable power can. By rapidly modulating the laser power in accordance with the dither algorithm, repeated pulses of closely spaced laser power may be used to achieve a carefully calibrated amount of material deposition, more accurately than variable depth engraving.

If the system is informed that variable depth engraving is the goal, then it may choose to move more slowly in order to allow higher horizontal resolution and greater energy-per-unit-time. For instance, the system may dither at the highest possible spatial resolution, with a goal of overlapping laser "dots" so that they average out. A dither algorithm that is optimized for even distribution of power across the region rather than optimal visible appearance can be chosen, such as, for example, an ordered dither algorithm instead of an error diffusion dither algorithm.

Calibrating Engrave Depth

Figure 19:
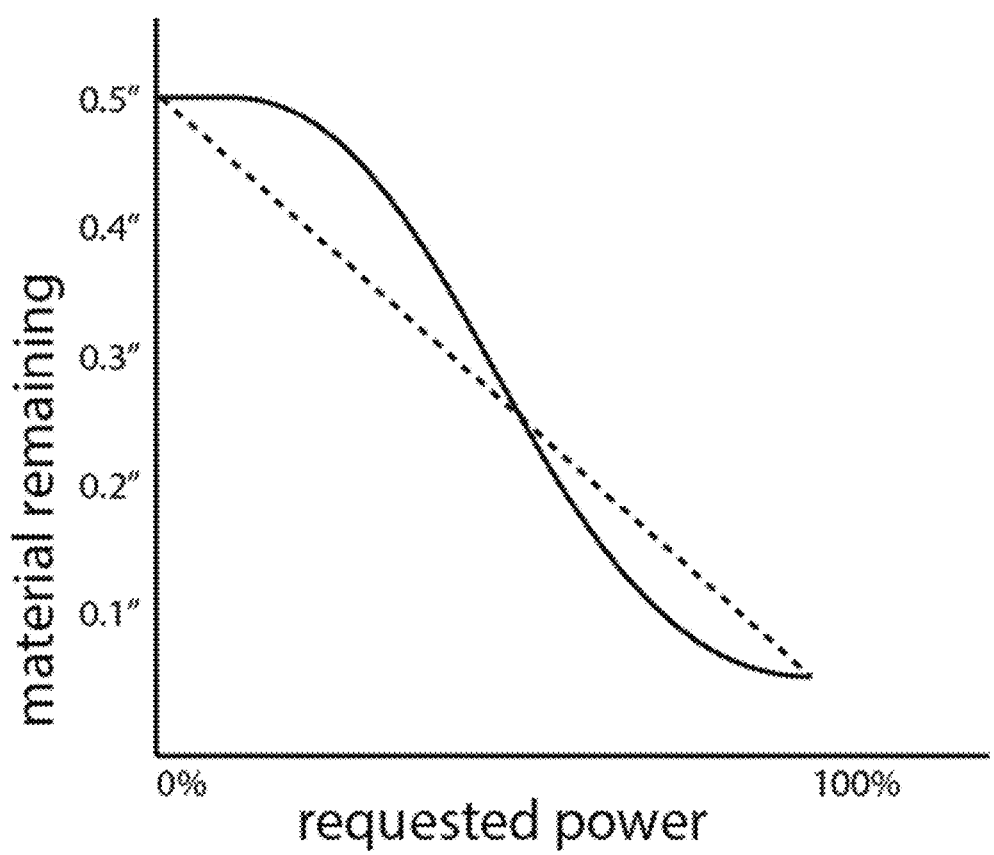
FIG. 19 is a diagram illustrating a transfer function between requested power and material removed, consistent with some implementations of the current subject matter.

FIG. 19 is a diagram illustrating a transfer function between requested power and material removed, consistent with some implementations of the current subject matter. When engraving, material removal may not be a linear function of power applied. For example, with a laser, deeper engraves may require more power because they must penetrate char left from previous passes. As such, deeper engraves tend to be poorly focused as deep, narrow engraves can suffer from occlusion by the side walls left behind by prior engraves.

Further, the ability of the laser to remove material may be nonlinear relative to the power of the laser. For instance, the laser may not actuate below 20% power such that a very light dither may mark but not engrave the surface of the material. Conversely, 100% power may consume more energy but not produce significantly more tool capability than 90% power.

In FIG. 19, it can be seen that as the power of the laser increases, material removal increases (and material remaining decreases). Nevertheless, the relationship is highly nonlinear. If a user wished to engrave a triangular shape, the user might instruct the system to increase its power from 0% to 100% (dotted line). However, the resulting quantity of material removed is nonlinear, as shown by the solid line.

For these reasons, calibrating the power setting of the laser based on the actual quantity of material removed may be beneficial. Once the transfer function of power to material removed/remaining is known, any power setting may be mapped to a quantity of material removed. For example, if the user starts with a 0.5" material and wants 0.4" remaining, the system can determine the power setting for achieving the removal of 0.1" of material and apply that power setting.

To properly accomplish this, then, the system should calibrate a transfer function such that there is a linear mapping of requested power to material removal. This can be accomplished by, for example, engraving a sample based on a linear ramp (or a sampling thereof) of power levels and then measuring the actual quantity of material removed. It should be appreciated that the system may need to be calibrated for different types of material, since material properties may affect the relationship between power and quantity of material removed. Moreover, calibration can be performed by a user automatically by the system (e.g., using a mechanism of depth measurement to read the results), and/or by the manufacturer or material supplier.

In another example, if the depth of the material varies as $$\sqrt[2]{x},$$

where x is the requested depth as indicated by, for example, the shade of grey in a greyscale bitmap where color indicates requested depth, the requested depth x may be squared prior to engraving so as to achieve a consistent depth to shade relationship (or any other relationship desired such as, for example, a logarithmic relationship). Similarly, if the material darkens in a nonlinear fashion with, for example, applied power, then the transfer function between requested color and power applied may be nonlinear, and may thus be measured or calculated based on parameters such as material, tool performance, and observed behaviors to provide a calibrated, linear (or other desirable function) relationship between requested color and power.

Multi-Pass with Variable Focus

FIG. 20 is a diagram illustrating multi-pass engraving with a variable focus CNC machine, consistent with some implementations of the current subject matter. When the user desires to create a carving with significant depth, there is a distinct challenge with lasers as they have an optimal focusing range and the desired depth may lie outside that range. For instance, a laser focused on the surface of 0.5" thick material may be able to engrave it to 0.3", but engraving deeper may cause the beam to diverge so much that the engrave quality suffers. To address this issue, a multi-pass approach may be used, with the laser refocusing after each pass. One algorithm for two passes is to first engrave everything to a depth of up to 0.3", then to refocus at 0.3", and engrave again only anything that is deeper than 0.3". This is only possible if there is a linear relationship between the requested amount of engraving and the actual engraving, a condition that may be met by calibrating engraving depth.

An example of this is given by using a height map, where white indicates zero depth and black indicates that it should be engraved to a depth of 0.1". In FIG. 19, the top left corner shows as a gradient progressing from black on the left to white on the bottom. The desired profile to be cut in a board is shown on the right—a simple triangular notch. To properly determine the engraving passes, two copies are made of the gradient. The first copy (shown center-left) is filtered so that anything darker than 50% becomes 100% black, and anything from 0-50% becomes twice as dark—49% grey becoming 98% grey; 25% grey becoming 50% grey; etc. This creates a gradient over half of the image, and solid black on the left half. When this is engraved, the shallow part of the gradient will be correctly rendered, and the deeper part will be engraved to the maximum 0.3" depth (center-right). For the second copy, a similar transform is performed on the copy of the original gradient, with anything lighter than 50% grey becoming white, and anything darker than 50% grey becoming twice as dark. The lens is then focused at 0.3" and the second gradient is engraved, completing the process. This may of course be combined with other techniques. The grey, for example, may be rendered by varying tool power or depth, or by dithering. High resolution dithering with many tools that remove material, particularly lasers, allows for very accurate variable material removal as desired by this technique.

Multicolor Engraving

Figure 21:
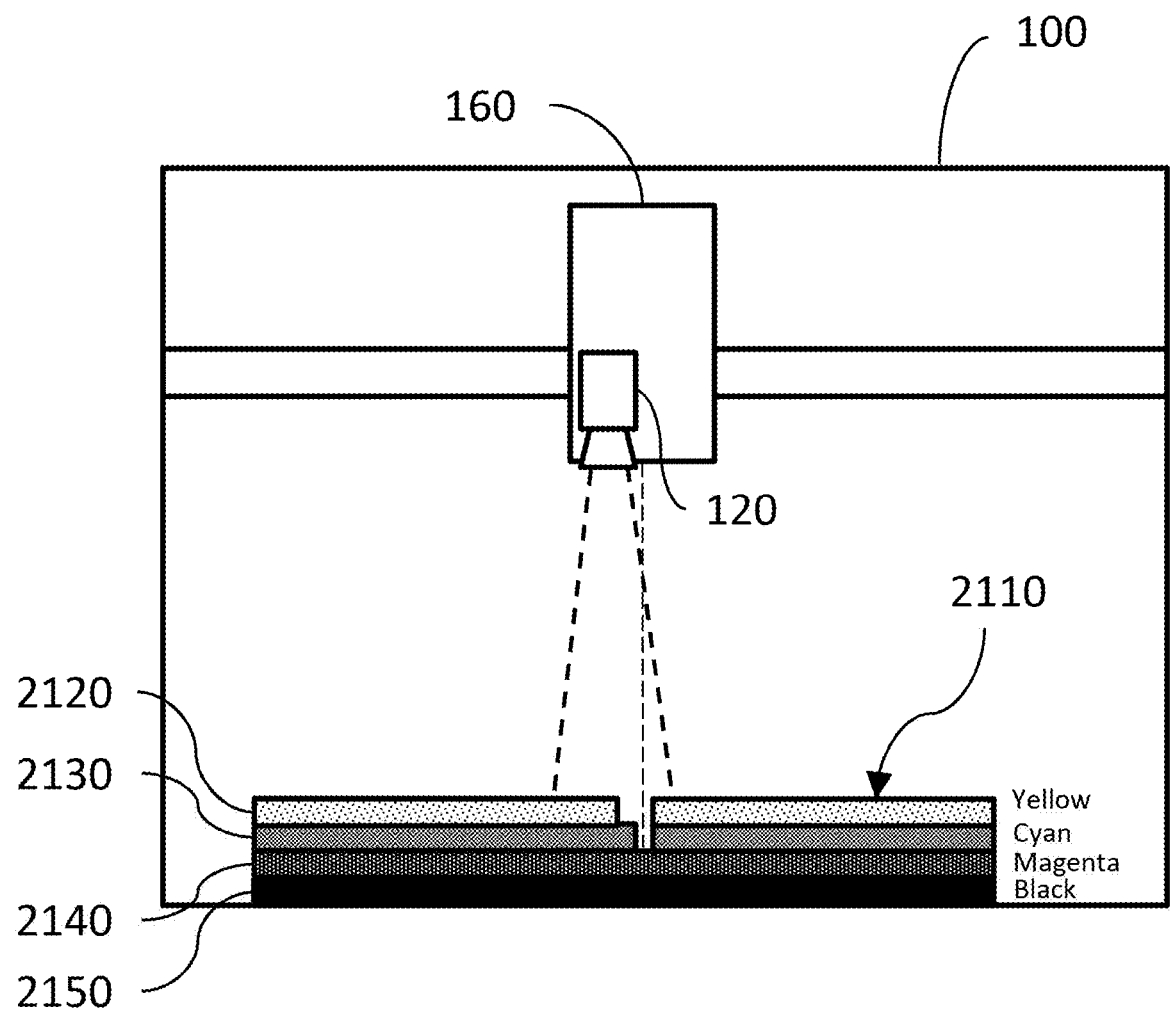
FIG. 21 is a diagram illustrating varying cut depths to generate a color pattern in a multi-layered material.

FIG. 21 is a diagram illustrating varying cut depths to generate a color pattern in a multi-layered material 2110. In one implementation, materials of different color can be layered and cut to a predefined depth to expose a particular color. For example, there can be layers corresponding to the CMYK color model with the layers being cyan, magenta, yellow, and black. Small cuts, or even just spots, can be made to a prescribed depth corresponding to one of the layers by varying the output power of the laser, the duration of laser exposure, and/or the focus of the laser. The depth and density of the cuts can provide a pattern on the material 140 that represents any color combination. Additionally, the cameras, for example the head camera 120, can monitor the exposed colors in order to verify that the cuts are at the depth specified by the motion plan. In the example shown with FIG. 21, there is a yellow layer 2120, a cyan layer 2130, a magenta layer 2140, and a black layer 2150. Two cuts are shown, one to expose the cyan surface and one to expose the magenta surface. The cuts can be made to form a dot matrix pattern, thereby generating what, at a distance, appears to be a continuous color blend. Other cuts/engravings can be made to expose a color at a particular depth. The inverse process can also be implemented where the cut proceeds until a certain color is exposed, at which time the cut stops. This can provide one method of cutting to a prescribed depth without a priori knowledge of the cutting parameters (power, duration, etc.) to reach the prescribed depth. Also, any of the dithering techniques described herein can be combined with cutting to a prescribed depth to expose the colors of the multi-layered material.

According to various implementations of the current subject matter, a method for dithering can include: receiving, at a computer numerically controlled machine comprising a laser, a motion plan corresponding to a first image; and dithering, according to the motion plan, the output of the laser to effect a change in a material within an interior space of the computer numerically controlled machine. The change can substantially reproduce at least a portion of the first image on the material. The dithering can include providing laser energy to the material at a native resolution based at least on a spot size of the laser. The spot size can be determined based at least on one or more parameters of the computer numerically controlled machine and/or one or more properties of the material. The laser energy can be delivered at locations separated by a distance no less than the spot size.

The spot size can be determined based on a laser power defined at the motion plan, a laser focal length retrieved from the computer numerically controlled machine, a material type stored at the computer numerically controlled machine, and/or a distance from the laser head to the material determined based on at least an image from a camera in the computer numerically controlled machine. The delivery of the laser energy can be limited by at least limiting the actuation of the laser head and/or selectively providing the laser output to the material. The limiting can be in accordance with one or more instructions defined in the motion plan.

The dithering can further include calculating, based on a first laser spot on an image of the material, an overlap of a second laser spot on pixels of the image adjacent to a center of the first laser spot. The overlap can be calculated in a direction of travel of the laser. The overlap can be further calculated based on a quantity of laser pulses delivered on the adjacent pixels at a speed of the laser and/or an oscillation frequency of the laser. A laser cross section profile can be determined based at least on a width of the first laser spot and a height of a line made by the laser on the material. The laser can apply a modification to a requested laser output based on the generated laser cross section profile and the overlap. The modification can be to at least one of an output power of the laser, the speed of the laser, and the spot size. The generated laser cross section profile can include a Gaussian oval associated with a height dimension and a width dimension. A power distribution along the height and the width can both be Gaussians having a full-width, half-maximum corresponding to the height and the width.

In various implementations of the current subject matter, a method for dithering can include: receiving, at a computer numerically controlled machine comprising a laser, a motion plan corresponding to a first image; and dithering, according to the motion plan, the output of the laser to effect a change in a material within an interior space of the computer numerically controlled machine. The change can substantially reproduce a portion of the first image on the material. The dithering can include providing laser energy to the material. The laser energy can be delivered to locations separated by a first horizontal distance no less than a first horizontal velocity of the laser head divided by a pulse rate of the laser and/or a second horizontal distance corresponding to a second horizontal step size and the pulse rate of the laser.

In various implementations of the current subject matter, a method for dithering can include altering a first image and/or a computer numerically controlled (CNC) machine parameter to dither a second image on a surface of a material. The second image can substantially reproduce the first image. The adjusting can include one or more of: adjusting a feature of the first image to alter an operation of the CNC machine while keeping the CNC machine parameter fixed; and adjusting the CNC machine parameter to alter the operation of the CNC machine while keeping features of the first image fixed. A motion plan can be generated based at least on the altered first image and/or the altered CNC machine parameter. The motion plan can be executed at the CNC machine to cause the second image to be dithered on the surface of the material.

The feature can include a color depth of the first image, a resolution of the first image, a type of the first image, whether the surface is to be marked to a uniform depth or a variable depth, and/or a user preference for a darker second image or a lighter second image. The CNC machine parameters can include at least one of: a tool spot size, a tool spot shape, the material being processed, a quantity of colors and/or shades the material can display, a speed at which the tool will move, an output power of the tool, a depth of to which the tool affects the material, whether a pulse technique and/or a drag technique are being used, a horizontal positioning resolution, a vertical positioning resolution, delays in changing tool parameters, a quantity of passes required to dither the second image, one or more focus settings of the tool, and a surface height of the material.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method for calibrating a computer numerically controlled machine comprising a laser, the method comprising:
identifying a material within an interior space of the computer numerically controlled machine;
determining a transfer function between a laser setting affecting a depth of a cut in the material and a projected quantity of the material to be removed by the cut, the determining comprising:
modifying the laser setting during a test engraving of a sample of the material such that a laser power applied in the test engraving is varied through a plurality of power levels, and
measuring an actual quantity of the material removed from the sample of the material corresponding to the plurality of power levels; and
applying laser energy to affect the material according to a design, the applying comprising applying the transfer function to determine one or more calibrated laser settings and activating the laser according to the one or more calibrated laser settings.

2. The method of claim 1, wherein the laser setting comprises one or more of power supplied to the laser, speed of the laser, lines-per-inch, focus of the laser, or number of passes of the laser.

3. The method of claim 1, wherein the modifying comprises a linear ramp through the plurality of power levels.

4. The method of claim 1, wherein the calibrating is performed for each of a plurality of different materials.

5. The method of claim 1, wherein the determining of the transfer function is performed automatically upon identifying the material.

6. The method of claim 1, wherein the identifying of the material comprises reading a bar code or receiving an input from a user.

7. The method of claim 6, wherein reading an identifier comprises using a camera to capture a bar code or other machine-readable marking on the material.

8. The method of claim 1, wherein the identifying comprises using a camera and image recognition software to identify the material.

9. The method of claim 1, wherein the determination of the transfer function further comprises measuring a colorization of the material of the sample corresponding to the plurality of power levels.

10. A computer program product comprising a non-transitory computer-readable medium storing instructions, which, when executed by at least one processor, result in operations comprising:
identifying a material within an interior space of a computer numerically controlled machine, the computer numerically controlled machine comprising a laser;
determining a transfer function between a laser setting affecting a depth of a cut in the material and a projected quantity of the material to be removed by the cut, the determining comprising:
modifying the laser setting during a test engraving of a sample of the material such that a laser power applied in the test engraving is varied through a plurality of power levels, and
measuring an actual quantity of the material removed from the sample of the material corresponding to the plurality of power levels; and
applying laser energy to affect the material according to a design, the applying comprising applying the transfer function to determine one or more calibrated laser settings and activating the laser according to the one or more calibrated laser settings.

11. The computer program product of claim 10, wherein the laser setting comprises one or more of power supplied to the laser, speed of the laser, lines-per-inch, focus of the laser, or number of passes of the laser.

12. The computer program product of claim 10, wherein the modifying comprises a linear ramp through the plurality of power levels.

13. The computer program product of claim 10, wherein the calibrating is performed for each of a plurality of different materials.

14. The computer program product of claim 10, wherein the determining of the transfer function is performed automatically upon identifying the material.

15. The computer program product of claim 10, wherein the identifying of the material comprises reading a bar code or receiving an input from a user.

16. The computer program product of claim 15, wherein reading an identifier comprises using a camera to capture a bar code or other machine-readable marking on the material.

17. The computer program product of claim 10, wherein the identifying comprises using a camera and image recognition software to identify the material.

18. The computer program product of claim 10, wherein the determination of the transfer function further comprises measuring a colorization of the material of the sample corresponding to the plurality of power levels.

19. A system comprising for controlling a computer numerically controlled machine comprising a laser; the system comprising:
computer hardware configured to perform operations comprising:
identifying a material within an interior space of the computer numerically controlled machine;
determining a transfer function between a laser setting affecting a depth of a cut in the material and a projected quantity of the material to be removed by the cut, the determining comprising:
modifying the laser setting during a test engraving of a sample of the material such that a laser power applied in the test engraving is varied through a plurality of power levels, and
measuring an actual quantity of the material removed from the sample of the material corresponding to the plurality of power levels; and
applying laser energy to affect the material according to a design, the applying comprising applying the transfer function to determine one or more calibrated laser settings and activating the laser according to the one or more calibrated laser settings.

20. The system of claim 19, wherein the identifying comprises using a camera within the computer numerically controlled machine to capture an image of the material and using image recognition software to identify the material based on the image.

* * * * *